(12) United States Patent
Li (10) Patent No.: US 12,509,819 B2
(45) Date of Patent: Dec. 30, 2025

(54) MICRO-NANO STRUCTURE-BASED SUPER-HYDROPHOBIC FABRIC AND PREPARATION METHOD THEREFOR

(71) Applicant: SOOCHOW UNIVERSITY, Suzhou (CN)

(72) Inventor: Zhanxiong Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 301 days.

(21) Appl. No.: 18/036,916

(22) PCT Filed: Feb. 5, 2021

(86) PCT No.: PCT/CN2021/075665
§ 371 (c)(1),
(2) Date: May 15, 2023

(87) PCT Pub. No.: WO2022/165777
PCT Pub. Date: Aug. 11, 2022

(65) Prior Publication Data
US 2023/0416977 A1    Dec. 28, 2023

(51) Int. Cl.
*D06M 13/438*    (2006.01)

(52) U.S. Cl.
CPC ...... *D06M 13/438* (2013.01); *D06M 2200/12* (2013.01); *D06M 2400/01* (2013.01)

(58) Field of Classification Search
None
See application file for complete search history.

(56) References Cited

U.S. PATENT DOCUMENTS 4,309,453 A    1/1982 Reiner et al.

FOREIGN PATENT DOCUMENTS

| CN | 111472171 A | 7/2020 |
| CN | 111593570 A | 8/2020 |
| CN | 112048910 A | 12/2020 |
| CN | 112080937 A | 12/2020 |
| CN | 112878053 A | 6/2021 |

*Primary Examiner* — Ula C Ruddock
(74) *Attorney, Agent, or Firm* — SZDC Law PC (57) ABSTRACT

A micro-nano structure-based super-hydrophobic fabric and a preparation method therefor are disclosed. A brand-new method of combining carbene polymerization covalent grafting with solid surface self-assembly is used for the first time to prepare a modified fabric having super-hydrophobic and self-cleaning functions, by taking an aliphatic diazo compound and an aromatic diazo compound as monomers for carbene copolymerization to graft a fluorine-containing and phenyl-containing block copolymer having a single-carbon repeating unit onto the surface of a fabric by means of a covalent bond. A carbene polymer is crystallized under the induction of the surface of a fiber to drive self-assembly to construct a hierarchical roughened structure having a micro-nano composite structure on the surface of the fabric, and a secondary structure is a nano-scale mastoid-shaped structure imitating a lotus leaf surface.

10 Claims, 5 Drawing Sheets

MICRO-NANO STRUCTURE-BASED SUPER-HYDROPHOBIC FABRIC AND PREPARATION METHOD THEREFOR

This application is the National Stage Application of PCT/CN2021/075665, filed on Feb. 5, 2021, which is incorporated by reference for all purposes as if fully set forth herein.

TECHNICAL FIELD

The invention relates to a superhydrophobic fabric and its preparation method, in particular to a superhydrophobic fabric based on micro-nano structure and its preparation method, belonging to the technical field of special functional textiles and their preparations.

BACKGROUND OF INVENTION

With the development of biomimetic materials in recent years, some functional materials prepared by simulating unique phenomena in the natural world have constantly emerged. Among them, the most typical is the application of bionics in the field of preparation of superwetting materials, especially the research on the preparation of superhydrophobic and self-cleaning functional surfaces. This is closely related to us, such as umbrellas in daily life, industrial water-repellent cloth, and high-end oil resistant and stain resistant clothing fabrics. In fact, a truly superhydrophobic surface not only requires a static contact angle exceeding 150°, but also a certain roll angle generally less than 10°, in order to obtain truly practical superhydrophobic and self-cleaning effects.

There are two main methods for preparing superhydrophobic surfaces: "Up-bottom" and "Bottom-up". The former method mainly includes template method, etching method, and plasma treatment method, while the latter method mainly includes electrospinning method, self-assembly method, and interlayer deposition method. Among them, the "bottom-up" method relies on the chemical reaction of the precursor under specific reaction conditions, which is more applicable and universal. With increased preparation methods derived in recent years, there are currently two main types: one is to provide roughness by adding micro-nano particles on low surface energy surfaces, and the other is to chemically modify surfaces with existing textures or roughened structures. So there are two main ways to prepare superhydrophobic fabrics. One is to first construct a certain roughened structure on the surface of cotton fabric, and then use low surface energy substances to modify the roughened structure; Another method is to construct a roughened structure with low surface energy on the surface of the fabric with a one-step process.

At present, the research on the surface structure of superhydrophobic fabrics mainly focuses on the first method, that is, using inorganic micro-nano particles to construct a certain roughened structure on the fabric surface, and then using low surface energy substances containing fluorine/silicon to modify the roughened structure. The main method is to attach the inorganic micro-nano particles modified low surface energy polymer to the fabric surface through physical force, such as impregnation coating method and related methods derived from it. In these methods, the processes are cumbersome, the durability of noncovalent bond force is poor, and sometimes the necessary high temperature and high pressure will damage the fiber. However, there are few reports on one-step grafting of low surface energy polymer onto the fabric surface through covalent bonds, mainly because the traditional carbene polymer molecular chains have poor rigidity and are easy to form films, which cannot provide roughness, let alone micro-nano hierarchical composite structures.

SUMMARY OF THE INVENTION

Technical Problems

The invention aims at the problems existing in the preparation of superhydrophobic fabrics by traditional chemical grafting method at present: the covalent bonds of low surface energy polymer are grafted onto the fabric by chemical action, or some monomers containing low surface energy elements directly polymerize at the grafting sites on the fiber surface to generate low surface energy polymers. These two main covalent grafting methods are often unable to generate the roughened structure with a certain roughness due to the defects of traditional carbene polymerization, especially the micro-nano composite roughened structure required for preparing superhydrophobic functional surfaces. Therefore, the present invention disclosed a method for preparing superhydrophobic fabrics by chemical covalent grafting of carbene copolymerization. It used the functional groups on the fiber surface as covalent grafting sites, and covalently grafted the carbene block copolymers with single-carbon repetition and tridimensional regularity onto the fabric surface by carbene copolymerization. The chemically covalently grafted carbene block copolymers were induced to crystallize on the fiber surface, driving the self-assembly to ultimately generate the low surface energy roughened structures with micro-nano composite structures on the fabric surface. And the secondary structure resembled papillary morphology on lotus leaf surface.

Solutions to the Problems

Technical Solution

The technical solution for achieving the purpose of the present invention is: a superhydrophobic fabric based on micro-nano structure, and its preparation method is that the aliphatic diazo compound reacts with active fabric in the organic solvent under the action of a catalyst; then, the aromatic diazo compound is added for the covalent grafting reaction of carbene copolymerization to obtain a superhydrophobic fabric based on micro-nano structure. The present invention prepares the low surface energy roughened structure with micro-nano composite structure on the surface of the fabric by means of covalent grafting reaction of carbene copolymerization, and then prepares a superhydrophobic fabric, whose chemical formula is shown below:

In the present invention, the carbon chain fluoroalkyl alcohol is used as a starter to react with bromoacetyl bromide and N,N'-dimethylbenzenesulfonyl hydrazide sequentially to generate carbon chain fluoroalkyl diazoacetate, which is an aliphatic diazo compound; In the carbon chain fluoroalkyl alcohol, the carbon number is 3-10. Preferably, the carbon chain fluoroalkyl alcohol is short carbon chain fluoroalkyl alcohol, such as perfluorohexyl ethanol or perfluorobutyl ethanol. The reaction temperature is ~5~5° C., preferably 0~5° C.; the reaction time is 3~5 h.

In the present invention, the bromine-containing phenyl ester or phenyl ketone is used as a starter to react with N,N'-dimethylbenzenesulfonyl hydrazide to generate aromatic diazo phenyl ester compound or aromatic diazo phenyl ketone compound, which is an aromatic diazo compound. Preferably, the bromine-containing phenyl ester is phenyl bromoacetate; the bromine-containing phenyl ketone is 4-(Trifluoromethyl) phenacyl bromide. The reaction temperature is −5~5° C., preferably −5~0° C.; the reaction time is 3~5 hours.

In the present invention, the fabric is acylated and then reacted with N,N'-dimethylbenzenesulfonyl hydrazide to prepare an active fabric.

In the present invention, the catalyst is palladium chloride, allylpalladium (II) chloride dimer or bis (acetonitrile) dichloropalladium (II); an amount of catalyst is 0.3%~0.5% of the molar weight of aliphatic diazo compound.

In the present invention, the organic solvent is mixed solution of anhydrous tetrahydrofuran and/or ethanol absolute; the carbene polymerization reaction is carried out under shaking or stirring conditions; the temperature for the covalent grafting reaction of carbene copolymerization is 25~35° C., preferably 28~32° C.; the reaction time for the covalent grafting reaction of carbene copolymerization is 12-24 hours. Shaking refers to the movement of the fabric with the conical bottle; stirring refers to the movement of the fabric, while the conical bottle does not move.

In the present invention, the covalent grafting reaction of carbene copolymerization is carried out in the presence of $NaBPh_4$, and the amount of $NaBPh_4$ is 1.5%~2% of the molar weight of the aliphatic diazo compound.

In the present invention, a ratio of aliphatic diazo compound, aromatic diazo compound, and active fabric is 5 mmol: 5 mmol: (0.7-0.9) g.

The present invention discloses the application of aliphatic diazo compound and aromatic diazo compound in the preparation of superhydrophobic fabrics based on micro-nano structures, as well as the application of superhydrophobic fabrics based on micro-nano structures as self-cleaning hydrophobic materials.

Beneficial Effects of the Invention

Beneficial Effects

Compared with the prior art, the beneficial effects of the technical solution provided by the present invention lie in: the traditional physical modification methods for preparing superhydrophobic fabrics, such as impregnation coating method, chemical vapor deposition method and sol-gel method, are all based on the interaction of molecules between the fabric surface and the modifier, such as van der Waals force, hydrogen bond force, electrostatic adsorption, etc and these non covalent bond forces make the superhydrophobic effect of the fabrics easily weakened or lost, and some high temperature, high pressure and other conditions will damage the fibers. The covalent grafting of carbene copolymerization is carried out at room temperature, with minimal damage to the fabric, and the obtained superhydrophobic function is more durable under chemical forces.

Due to the inherent defects of traditional carbene polymerization, the current chemical grafting modification methods have a significant disadvantage, that is, the low surface energy compounds grafted on the fabric surfaces often form films or uneven blocks, unable to generate rough structures with uniform morphology. The present invention adopts a novel carbene polymerization method to make the covalently grafted low surface polymers crystallize under the induced action of the substrate, thereby forming a roughened structure with a certain geometric morphology through self-assembly.

It uses the molecular structure features of different precursors, such as aliphatic diazo compounds and aromatic diazo compounds, to homograft the fabrics under different processes to form roughened structures with different geometric morphologies. And micro-nano composite and even multi-level low surface energy roughened structures can be obtained through the molecular structures of short carbon chain fluoroalkyl and phenyl containing reasonably designed precursors.

The low surface energy compound used is a short fluoroalkyl chain material, which avoids the problem of long fluorocarbon chain polymers being prone to oxidative degradation to generate environmental pollutants in the natural environment, and it is a relatively environmentally friendly material. The preparation method of a superhydrophobic fabric is the "one bath method", which reacts at room temperature under mild conditions, and the byproduct is nitrogen, which does not require tail gas treatment, making it easy for industrial production and promotion.

EXAMPLES OF THE INVENTION

Examples of the Present Invention

The present invention utilizes carbene copolymerization covalently grafted fluorinated block copolymers to construct a secondary roughened structure based on micro-nano composite on the surface of fibers, and the secondary nano-sized structure exhibits an ideal papillary structure; the low surface energy compound used is a short fluoroalkyl chain material, which avoids the problem of long fluorocarbon chain polymers being prone to oxidative degradation to generate environmental pollutants in the natural environment, and it is a relatively environmentally friendly material. The preparation method of superhydrophobic fabrics is the "one bath method", which reacts at room temperature under mild conditions, and the byproduct is nitrogen, which does not require tail gas treatment, making it easy for industrial production and promotion. With reference to the accompanying drawings and Examples, the technical solution of the present invention will be described in detail.

Contact angle test: the OCAH200 Microscopic Droplet Wettability Tester from Dataphysics was used to test the wettability of the grafted functional fabric, the water was selected as the test droplet, and the volume of the droplet was 5 μL and the average of five tests was taken.

The raw materials involved in the present invention are all commercially available conventional products, and the fabric is conventional cotton fabric subject to conventional alkaline treatment; the specific operation method and test method are conventional techniques, while stirring and shaking are conventional methods. The operating parameters of all examples are the same, and after selecting stirring or shaking, the specific operating parameters have no impact on the technical effect of the present invention. Pretreatment of cotton fabric: at room temperature, the conventional cotton fabric was immersed in sodium hydroxide solution with mass fraction of 20% for 25 min, washed with distilled water three times, immersed in 5% glacial acetic acid for 30 min, washed to neutral with deionized water and dried to obtain alkalized cotton fabric. In the present invention, the fabric was acylated and then reacted with N,N'-dimethylbenzenesulfonyl hydrazide to prepare an active fabric, specifically: 0.815 g of alkalized cotton fabric was put into a conical flask containing 50 mL of anhydrous tetrahydrofuran and 1.68 g of sodium bicarbonate, cooled to 0° C., 1.68 g of bromoacetyl bromide under nitrogen was added for reaction at constant temperature for 30 min, and then put in a water bath shaker to naturally raise the temperature to 30° C. for thermostatic reaction for 15 hours, and then washed with tetrahydrofuran and deionized water sequentially, and dried to obtain brominated fabric. The brominated fabric was immersed in a conical flask containing anhydrous tetrahydrofuran, 5.11 g of N,N-bis(p-toluenesulfonyl) hydrazine was added, cooled to 0° C., 4.57 g of DBU was added dropwise under nitrogen, and reacted at 0° C. for 30 min, finally placed in a water bath shaker to naturally raise the temperature to 30° C. for oscillatory reaction at constant temperature for 20 hours. After the reaction was completed, it was cleaned with tetrahydrofuran and deionized water sequentially, and dried it to form an active fabric to be used in Examples and comparative examples of the present invention.

Synthesis Example: (1) Synthesis of 4'-(Trifluoromethyl) Diazo Acetophenone and Diazo Phenylacetate The three-neck flask was equipped with a thermometer, and a T-shaped tee connected to nitrogen. 60 mL of anhydrous tetrahydrofuran, 1.34 g of 2-bromo-4'-(trifluoromethyl) acetophenone, and 3.41 g of N,N-bis(p-toluenesulfonyl) hydrazine were added to the flask and cooled to 0° C., and 3.82 g of DBU was added dropwise to the mixed liquor (dripping was completed within 15 minutes) for thermostatic reaction of 3 hours. After the reaction, quenching reaction was made with deionized water, extracted with dichloromethane 3 times, dried with anhydrous magnesium sulfate to obtain 0.77 g product of 4'-(Trifluoromethyl) diazo acetophenone by removing the low boiling point solvent by means of suction filtration and rotary evaporation. FT-IR (KBr, cm$^{-1}$): 3108, 2937(C—H); 2111(C=N2); 1621(C=O); 1576(C—C); 1324(C—F); 762(C—F3); 708(C—H). $^1$HNMR (400 MHz, CDCl3): 7.11-7.48 (Ph—H); 7.60-7.96 (Ph—H); 4.78(H—C=N2) ppm.

The three-neck flask was equipped with a thermometer, and a T-shaped tee connected to nitrogen. 60 mL of anhydrous tetrahydrofuran, 1.08 g of phenyl bromoacetate, and 3.41 g of N,N-bis(p-toluenesulfonyl) hydrazine were added to the flask and cooled to 0° C., and 3.82 g of DBU was added dropwise to the mixed liquor (dripping was completed within 15 minutes) for thermostatic reaction of 3 hours. After the reaction, the quenching reaction was made with deionized water, the saturated sodium bicarbonate solution was added, extracted with dichloromethane 3 times, dried with anhydrous magnesium sulfate to obtain 0.55 g product of diazo phenylacetate by removing the low boiling point solvent by means of suction filtration and rotary evaporation. FT-IR(KBr, cm$^{-1}$): 3133 (C—H); 2117 (C=N2); 1705 (C=O); 1594 (C—C); 1292 (CO-O); 728, 708 (C—H). $^1$H NMR (400 MHz, CDCl$_3$): 7. 11(Ph—H); 7.25 (Ph—H); 7.37 (Ph—H); 4.79 (H—C=N2) ppm.

(2) Synthesis of Tridecafluorooctyl Diazoacetate (1) The three-neck flask was equipped with a thermometer, and a T-shaped tee connected to nitrogen. 50 mL of anhydrous tetrahydrofuran, 1.82 g of perfluorohexyl ethanol and 1.26 g of sodium bicarbonate were added into the three-necked flask and cooled to 0° C. 1.54 g of bromoacetyl bromide was added dropwise for thermostatic reaction for 3 h to obtain 2.09 g of intermediate product of tridecafluorooctyl diazoacetate. Then the prepared intermediate was put into a three-necked flask containing 60 mL of anhydrous tetrahydrofuran, 3.41 g of N,N-bis(p-toluenesulfonyl) hydrazine was added and cooled to 0° C., and 3.82 g of DBU was added dropwise into the mixed solution for reaction for 3 h. After the reaction, quenching reaction was made with deionized water, extracted with dichloromethane 3 times, dried with anhydrous magnesium sulfate to obtain 1.64 g product of tridecafluorooctyl diazoacetate by removing the low boiling point solvent by means of suction filtration and rotary evaporation.

Preparation of hydrophobic fabric in Examples 1: 5 mmol of synthesized 4'-(Trifluoromethyl) diazo acetophenone was added to a round-bottom flask containing 60 mL of anhydrous tetrahydrofuran and the active fabric was immersed into the flask, then 9.15 mg (0.025 mmol) (π-allylPdCl)$_2$ was added and placed at −10° C., and then 32.5 mg (0.09 mmol) NaBPh$_4$ was added and then the conical flask was moved to a water bath shaker at 0° C. for 1 hour of oscillatory reaction, then the temperature was raised to 10° C. for 1 hour of reaction, 20° C. for 1 hour of reaction, and finally 30° C. for 12 hours of reaction. After the reaction, the fabric of graft polymer was cleaned with ethanol and deionized water sequentially, and dried it at 50° C. The water contact angle was 106°.

Figure 1:
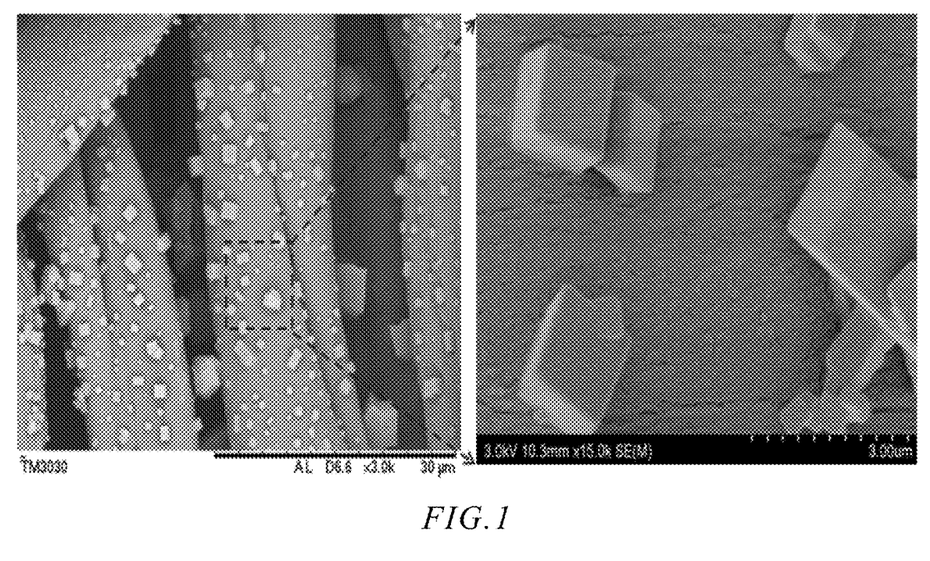
FIG. 1 is a scanning electron microscope (SEM) image of the surface of the fabric after carbene polymerization grafting prepared in Examples 1. The fiber surface is distributed with cubic block polymer crystals of varying sizes and uniform dispersion, the crystal surface is flat and smooth, and all six surfaces are regular quadrilaterals. The water contact angle is 125°.

5 mmol of synthesized 4'-(Trifluoromethyl) diazo acetophenone was added to a round-bottom flask containing 60 mL of anhydrous tetrahydrofuran and the active fabric was immersed into the flask, then 9.15 mg (π-allylPdCl)$_2$ was added and placed at −10° C., and then 32.5 mg NaBPh$_4$ was added, and the round-bottom flask was placed on a magnetic stirrer at 0° C. for 1 hour of oscillatory reaction, and the fabric reacted for 1 hour under dynamic stirring (fabric rotation with similar intensity to shaking), then the temperature was raised to 10° C. for 1 hour of reaction, 20° C. for 1 hour of reaction, and finally 30° C. for 12 hours of reaction. After the reaction, the fabric of graft polymer was cleaned with ethanol and deionized water sequentially, and dried at 50° C. The water contact angle was 125°, and the surface structure is shown in FIG. 1.

Figure 2:
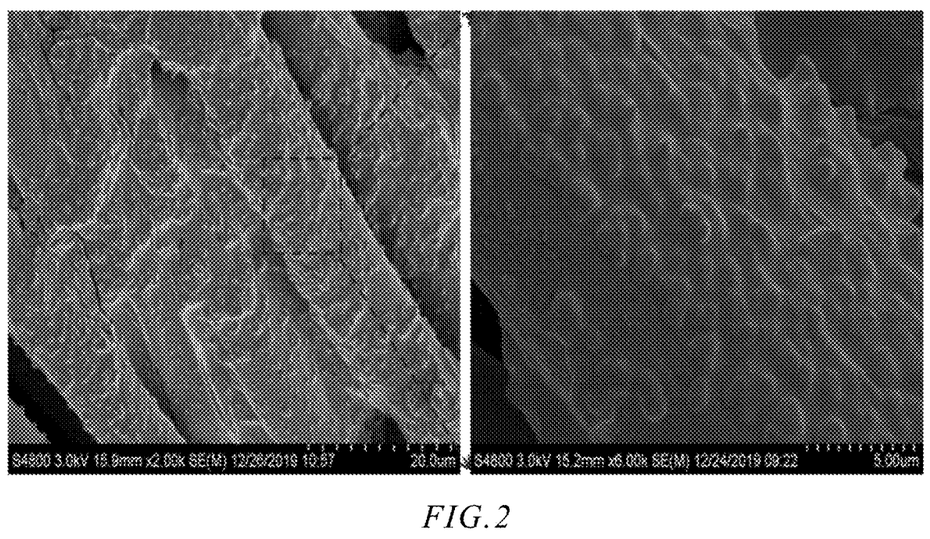
FIG. 2 is a scanning electron microscope (SEM) image of the surface of the fabric after carbene polymerization grafting prepared in Example 2. The surface of the fiber is covered by a dense coating, and a large number of evenly distributed micron-scale papillary particles are embedded in the coating, with its bottom firmly embedded in the coating. The water contact angle is 132°.

Preparation of hydrophobic fabric in Example 2: 5 mmol of the synthesized 4'-(Trifluoromethyl) diazo acetophenone was added into a conical flask containing a mixture of of anhydrous tetrahydrofuran and 10 mL of ethanol absolute, the active fabric was immersed into the flask, 9.15 mg (π-allylPdCl)$_2$ was added, then it was put in a low-temperature reactor and cooled to −10° C., and 32. 5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, and finally 30° C. for 12 hours of reaction. After the reaction, the fabric of graft polymer was cleaned with ethanol and deionized water sequentially, and dried at 50° C. The water contact angle was 132°, and the surface structure is shown in FIG. 2.

Figure 3:
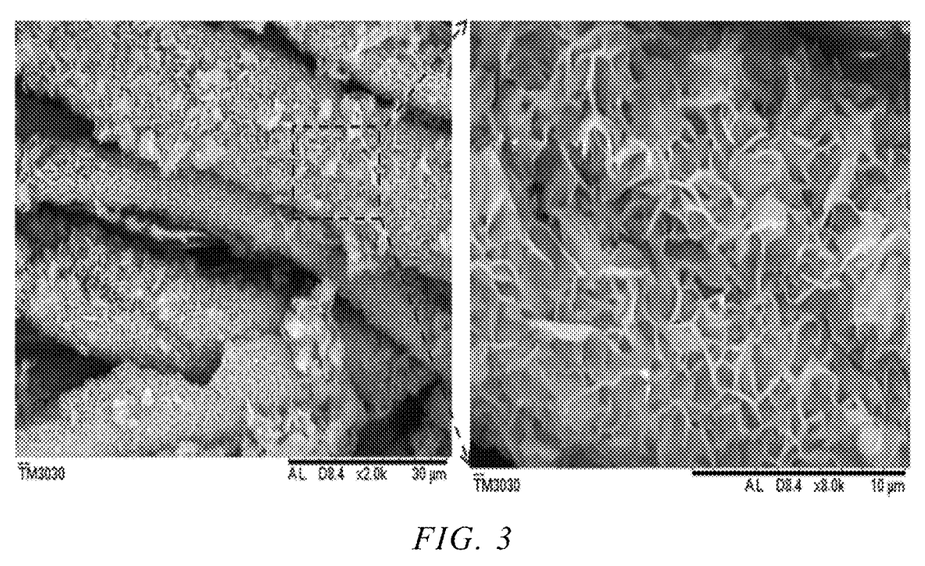
FIG. 3 is a scanning electron microscope (SEM) image of the surface of the fabric after carbene polymerization grafting prepared in Example 3, and a single fiber is wrapped in a complete laminar leaf and arranged tightly. These thin leaves, like peanut leaves, form a ridge separation network, and the surface of the leaves is smooth.

Preparation of hydrophobic fabric in Example 3: 5 mmol of the synthesized diazo phenylacetate was added into a conical flask containing 60 mL of anhydrous tetrahydrofuran, the active fabric was immersed into the flask, 9.15 mg (π-allylPdCl)$_2$ was add, then it was put in a low-temperature reactor and cooled to −10° C., and 32.5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, and finally 30° C. for 12 hours of reaction. After the reaction, the fabric of graft polymer was cleaned with ethanol and deionized water sequentially, and dried at 50° C., and the surface structure is shown in FIG. 3.

Figure 4:
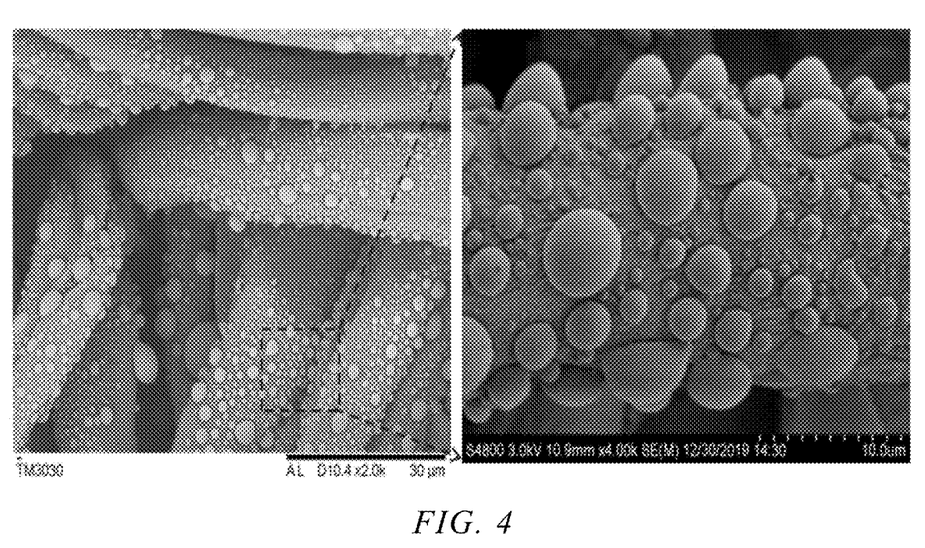
FIG. 4 is a scanning electron microscope (SEM) image of the surface of the fabric after carbene polymerization grafting prepared in Example 4, and a layer of uniform micron-sized spherical particles is dispersed on the surface of the fiber, with no aggregation between the particles and with smooth surfaces of the particles.

Preparation of hydrophobic fabric in Example 4: 5 mmol of the synthesized diazo phenylacetate was added into a round-bottom flask containing 60 mL of anhydrous tetrahydrofuran, the active fabric was immersed into the flask, 9.15 mg (π-allylPdCl)$_2$ was add, then it was put in a low-temperature reactor and cooled to −10° C., and 32.5 mg of NaBPh$_4$ was added. The round-bottom flask was placed on a magnetic stirrer at 0° C. for 1 hour of reaction under dynamic rotation (fabric rotation with similar intensity to shaking), then the temperature was raised to 10° C. for 1 hour of reaction, 20° C. for 1 hour of reaction, and finally 30° C. for 12 hours of reaction. After the reaction, the fabric of graft polymer was cleaned with ethanol and deionized water sequentially, and dried at 50° C., and the surface structure is shown in FIG. 4.

Figure 5:
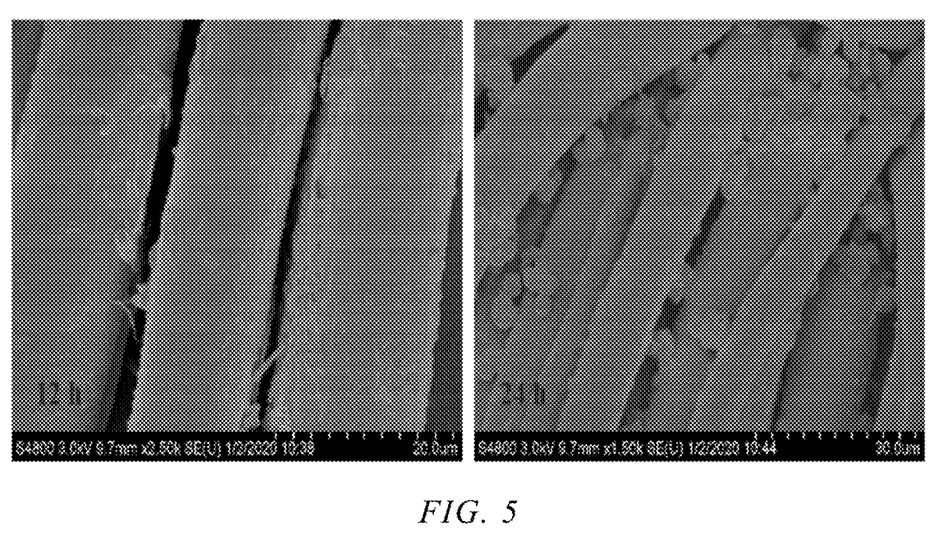
FIG. 5 is a scanning electron microscope (SEM) image of the surface of the fabric after carbene polymerization grafting prepared in Examples 5, and polymers are more likely to form stacked particles on the surface of fiber, and the surface is smooth.

Preparation of hydrophobic fabric in Examples 5: 5 mmol of the synthesized diazo phenylacetate was added into a conical flask containing 50 mL of anhydrous tetrahydrofuran and 10 mL of ethanol absolute, the active fabric was immersed into the flask, 9.15 mg (π-allylPdCl)$_2$ was added, then it was put in a low-temperature reactor and cooled to −10° C., and 32.5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, and finally 30° C. for 12 hours of reaction. After the reaction, the fabric of graft polymer was cleaned with ethanol and deionized water sequentially, and dried at 50° C., and the surface structure is shown in FIG. 5.

Figure 6:
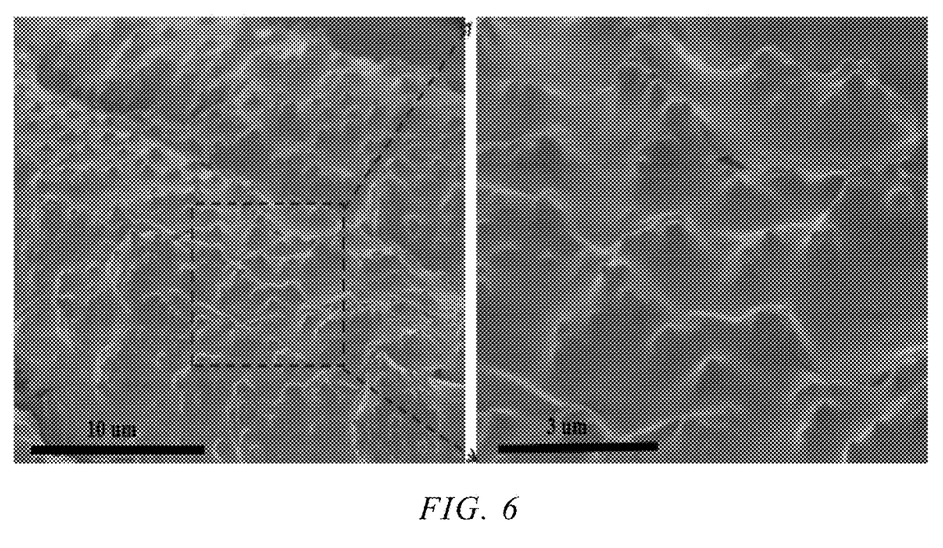
FIG. 6 is a scanning electron microscope (SEM) image of the surface of the fabric after carbene copolymerization grafting prepared in Example 6, and the surface of the fiber is covered with densely packed irregular micron-sized particles, and the particle surface continues to grow into nano-sized protrusion. As the roughened structure continues to grow, the nano-sized particles enriched on the surfaces of micron-sized particles have formed regular papillae, thus forming a very perfect micro-nano sized secondary roughened structure. The water contact angle is 155°.

Preparation of hydrophobic fabric in Example 6: 5 mmol of the synthesized diazo phenylacetate was added into a conical flask containing 50 mL of anhydrous tetrahydrofuran and 10 mL of ethanol absolute, the active fabric was immersed into the flask, 9.15 mg (π-allylPdCl)$_2$ was added, then it was put in a low-temperature reactor and cooled to −10° C., and 32.5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, and 25° C. for 3 hours of reaction, and 5 mmol of the synthesized tridecafluorooctyl diazoacetate was added for 1 h of reaction and the temperature was raised to for 12 hours of reaction. After the reaction, the fabric of graft copolymer was cleaned with ethanol and deionized water sequentially, and dried at 50° C. The water contact angle was 155°, and the surface structure is shown in FIG. 6, and the surface roll angle was only 7°.

Figure 7:
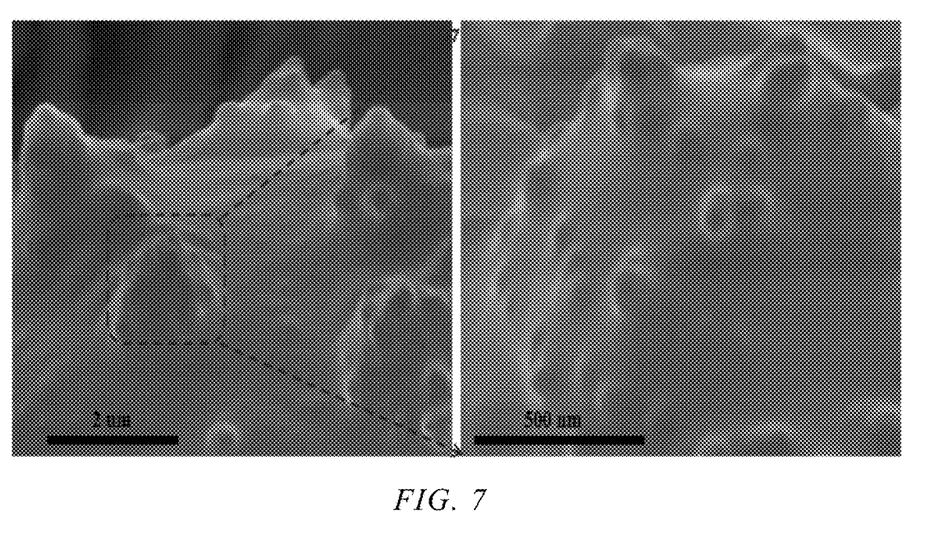
FIG. 7 is a scanning electron microscope (SEM) image of the surface of the fabric after carbene copolymerization grafting prepared in Example 7, and the surface of the fiber is covered with densely packed irregular micron-sized particles, and the particle surface continues to grow into nano-sized protrusion. As the roughened structure continues to grow, the nano-sized particles enriched on the surfaces of micron-sized particles have formed regular papillae, thus forming a very perfect micro-nano sized secondary roughened structure. The water contact angle is 158°.

Preparation of hydrophobic fabric in Example 7: 5 mmol of the synthesized diazo phenylacetate was added into a conical flask containing a mixture of 50 mL of anhydrous tetrahydrofuran and 10 mL of ethanol absolute, the active fabric was immersed into the flask, 9.15 mg (π-allylPdCl)$_2$ was added, then it was put in a low-temperature reactor and cooled to −and 32.5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, 25° C. for 3 hours of reaction, and 5 mmol of the synthesized tridecafluorooctyl diazoacetate was added for 1 h of reaction and the temperature was raised to for 24 hours of reaction. After the reaction, the fabric of graft copolymer was cleaned with ethanol and deionized water sequentially, and dried at 50° C. The water contact angle was 158°, and the surface structure is shown in FIG. 7, and the surface roll angle was only 5°.

Figure 8:
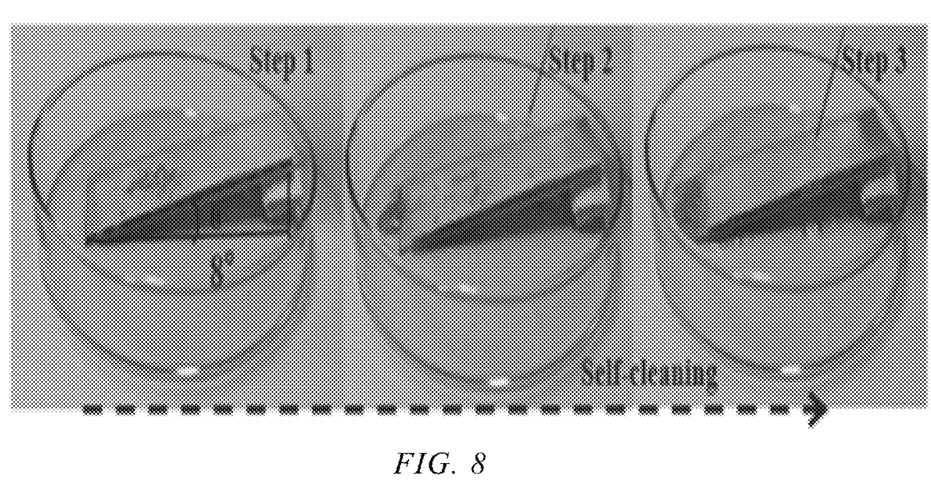
FIG. 8 shows the self-cleaning test effect of the superhydrophobic fabric prepared in Example 7.
Figure 9:
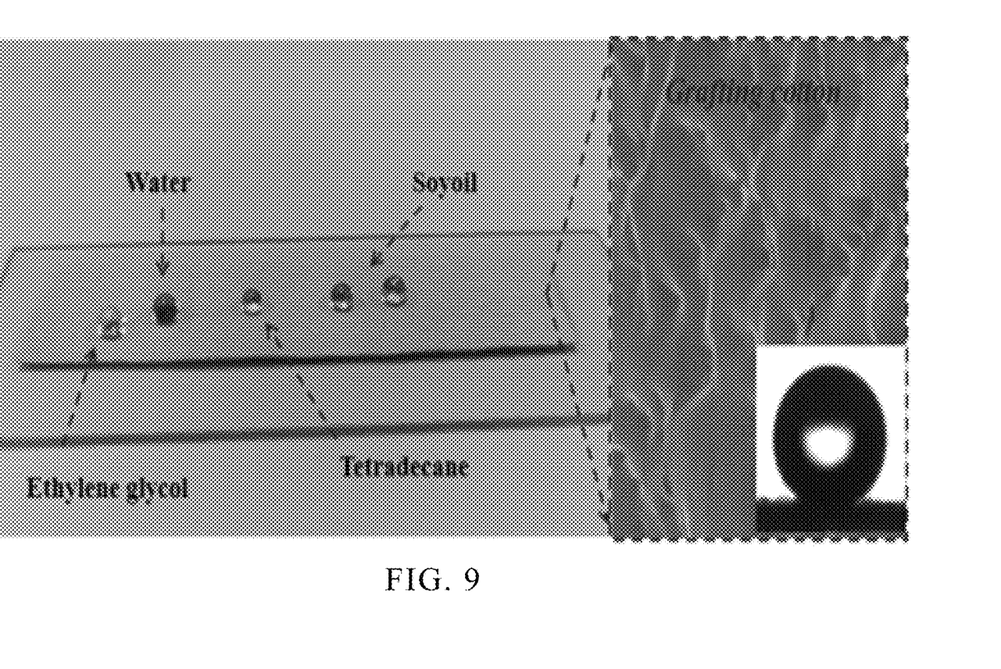
FIG. 9 shows the liquid repellency of the superhydrophobic fabric prepared in Example 7 to different liquids.

As shown in FIG. 8, the stain used was chalk powder. When water droplets flew through the surface of the modified fabric covered with powdery dirt, they could naturally slide off and the surface dirt was removed, demonstrating good self-cleaning ability; as shown in FIG. 9, the liquid repellency test used liquids with different properties such as distilled water, ethylene glycol, n-tetradecane, and edible soybean oil. These liquids remained on the surface as complete droplets without infiltration. In contrast, when the active fabric came into contact with water droplets, the water droplets quickly spread out and were absorbed by the fabric.

Comparative: 5 mmol of the synthesized tridecafluorooctyl diazoacetate was added into a conical flask containing a mixture of 50 mL of anhydrous tetrahydrofuran and 10 mL of ethanol absolute, the active fabric was immersed into the flask, 9.15 mg ($\pi$-allylPdCl)$_2$ was added, then it was put in a low-temperature reactor and cooled to −10° C., and 32.5 mg of NaBPh$_4$ was added. The conical flask was moved into the water bath shaker at 0° C. for oscillation for 1 h, then the temperature was raised to 10° C. for 1 h of reaction, 20° C. for 1 h of reaction, and finally 30° C. for 24 hours of reaction. After the reaction, the fabric of graft copolymer was cleaned with ethanol and deionized water sequentially, and dried at 50° C. The water contact angle was 154°, but it didn't have self-cleaning function. The same chalk powder test was carried out and when the water droplets flew through the surface of the modified fabric covered with powdery dirt, the surface dirt could not be removed and there were residues on the fabric surface, because the surface structure was different from that in the present invention; after the same test, the hydrophobic fabric prepared in Example 2 and Examples 5 did not have self-cleaning function, and there were powder residues on the fabric surface.

Preparation of hydrophobic fabric in Examples 8: 5 mmol of the synthesized 4'-(Trifluoromethyl) diazo acetophenone was added into a conical flask containing a mixture of mL of anhydrous tetrahydrofuran and 10 mL of ethanol absolute, the active fabric was immersed into the flask, 9.15 mg ($\pi$-allylPdCl)$_2$ was added, then it was put in a low-temperature reactor and cooled to −10° C., and 32.5 mg of NaBPh$_4$ was added. The conical flask was moved into the water bath shaker at 0° C. for oscillatory reaction for 1 h, then the temperature was raised to 10° C. for 1 h of reaction, 20° C. for 1 h of reaction, and 25° C. for 3 hours of reaction, and of the synthesized tridecafluorooctyl diazoacetate was added for 1 h of reaction and the temperature was raised to 30° C. for 24 hours of reaction. After the reaction, the fabric of graft copolymer was cleaned with ethanol and deionized water sequentially, and dried at 50° C. The water contact angle was 142°.

Preparation of hydrophobic fabric in Examples 9: 5 mmol of the synthesized 4'-(Trifluoromethyl) diazo acetophenone was added into a conical flask containing a mixture of mL of anhydrous tetrahydrofuran and 10 mL of ethanol absolute, the active fabric was immersed into the flask, 9.15 mg ($\pi$-allylPdCl)$_2$ was added, then it was put in a low-temperature reactor and cooled to −10° C., and 32.5 mg of NaBPh$_4$ was added. The round-bottom flask was placed on a magnetic stirrer at 0° C. for 1 hour of reaction under dynamic rotation of fabric (fabric rotation with similar intensity to shaking), then the temperature was raised to 10° C. for 1 hour of reaction, 20° C. for 1 hour of reaction, and then 5 mmol of the synthesized tridecafluorooctyl diazoacetate was added for 1 h of reaction and the temperature was raised to for 12 hours of reaction. After the reaction, the fabric of graft copolymer was cleaned with ethanol and deionized water sequentially, and dried at 50° C. The water contact angle was 152°.

Preparation of hydrophobic fabric in Examples 10: 5 mmol of the synthesized diazo phenylacetate was added into a conical flask containing a mixture of 50 mL of anhydrous tetrahydrofuran and 10 mL of ethanol absolute, the active fabric was immersed into the flask, 9.15 mg ($\pi$-allylPdCl)$_2$ was added, then it was put in a low-temperature reactor and cooled to −and 32.5 mg of NaBPh$_4$ was added. The round-bottom flask was placed on a magnetic stirrer at 0° C. for 1 hour of reaction under dynamic rotation of fabric (fabric rotation with similar intensity to shaking), then the temperature was raised to 10° C. for 1 hour of reaction, 20° C. for 1 hour of reaction, and then 5 mmol of the synthesized tridecafluorooctyl diazoacetate was added for 1 h of reaction and the temperature was raised to 30° C. for 12 hours of reaction. After the reaction, the fabric of graft copolymer was cleaned with ethanol and deionized water sequentially, and dried at 50° C. The water contact angle was 146°.

The invention discloses a superhydrophobic fabric, which expands the application research of carbene polymerization in the field of preparation of superwetting function surfaces. The novel carbene polymerization has the characteristics of single-carbon repetition and tridimensional regularity, and it can construct the roughened structure with a certain roughness on the fiber surface through covalent grafting by utilizing copolymerization with different functional side groups. It constructs the low surface energy roughened structure with micro-nano composite structure on the fabric surface with one step process by inducing the crystallization of carbene copolymer on the fiber surface to drive self-assembly to obtain a modified fabric with superhydrophobic and self-cleaning properties.

The invention claimed is:

1. A superhydrophobic fabric based on micro-nano structure, wherein a preparation method of the superhydrophobic fabric based on micro-nano structure comprises: reacting an aliphatic diazo compound with an active fabric in an organic solvent under an action of a catalyst; and adding an aromatic diazo compound for a covalent grafting reaction of carbene copolymerization to obtain the superhydrophobic fabric based on micro-nano structure.

2. The superhydrophobic fabric based on micro-nano structure according to claim 1, wherein a carbon chain fluoroalkyl alcohol is used as a starter to react with bromoacetyl bromide and N,N'-dimethylbenzenesulfonyl hydrazide sequentially to generate the aliphatic diazo compound; a bromine-containing phenyl ester or a bromine-containing phenyl ketone is used as a starter to react with N,N'-dimethylbenzenesulfonyl hydrazide to prepare the aromatic diazo compound.

3. The superhydrophobic fabric based on micro-nano structure according to claim 2, wherein in the carbon chain fluoroalkyl alcohol, a carbon number is 3-10.

4. The superhydrophobic fabric based on micro-nano structure according to claim 2, wherein when the aliphatic diazo compound is prepared, a reaction temperature is −5~5° C. and a reaction time is 3-5 hours; and when the aromatic diazo compound is prepared, a reaction temperature is −5~5° C. and a reaction time is 3-5 hours.

5. The superhydrophobic fabric based on micro-nano structure according to claim 2, wherein the carbon chain fluoroalkyl alcohol is perfluorohexyl ethanol or perfluorobutyl ethanol; the bromine-containing phenyl ester is phenyl bromoacetate; and the bromine-containing phenyl ketone is 4-(Trifluoromethyl) phenacyl bromide.

6. The superhydrophobic fabric based on micro-nano structure according to claim 1, wherein a fabric is acylated and reacted with N,N'-dimethylbenzenesulfonyl hydrazide to prepare the active fabric.

7. The superhydrophobic fabric based on micro-nano structure according to claim 1, wherein the catalyst is palladium chloride, allylpalladium (II) chloride dimer or bis(acetonitrile) dichloropalladium (II); the organic solvent is anhydrous tetrahydrofuran and/or ethanol absolute; and the covalent grafting reaction of carbene copolymerization is carried out in the presence of $NaBPh_4$.

8. The superhydrophobic fabric based on micro-nano structure according to claim 1, wherein the carbene polymerization reaction is carried out under shaking or stirring; the temperature for the covalent grafting reaction of carbene copolymerization is 25~35° C.; and the reaction time for the covalent grafting reaction of carbene copolymerization is 12-24 hours.

9. The superhydrophobic fabric based on micro-nano structure according to claim 1, wherein: the carbene polymerization reaction is carried out under shaking or stirring; the temperature for the covalent grafting reaction of carbene copolymerization is 25~35° C.; the reaction time for the covalent grafting reaction of carbene copolymerization is 12-24 hours.

10. The superhydrophobic fabric based on micro-nano structure according to claim 1 is applied as a self-cleaning hydrophobic material.

* * * * *